(12) United States Patent
Akiyama et al.

(10) Patent No.: US 7,083,187 B2
(45) Date of Patent: Aug. 1, 2006

(54) ON-VEHICLE AIRBAG APPARATUS

(75) Inventors: Hideki Akiyama, Saitama (JP); Satoshi Iijima, Saitama (JP); Takenori Yamamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 145 days.

(21) Appl. No.: 10/392,817

(22) Filed: Mar. 21, 2003

(65) Prior Publication Data

US 2003/0222439 A1 Dec. 4, 2003

(30) Foreign Application Priority Data

Mar. 26, 2002 (JP) ............... 2002-085679

(51) Int. Cl.
*B60R 21/239* (2006.01)
*B60R 21/276* (2006.01)

(52) U.S. Cl. .............. 280/730.1; 280/739; 280/742

(58) Field of Classification Search ............ 280/730.1, 280/739, 742
See application file for complete search history.

(56) References Cited

U.S. PATENT DOCUMENTS

| | | | |
|---|---|---|---|
| 5,184,845 A * | 2/1993 | Omura | 280/735 |
| 5,853,192 A | 12/1998 | Sikorski et al. | |
| 5,918,901 A | 7/1999 | Johnson et al. | |
| 5,967,545 A * | 10/1999 | Iijima et al. | 280/730.1 |
| 6,161,866 A | 12/2000 | Ryan et al. | |
| 6,213,502 B1 * | 4/2001 | Ryan et al. | 280/736 |
| 6,241,279 B1 * | 6/2001 | Ochiai | 280/735 |
| 6,279,949 B1 | 8/2001 | Braunschädel | |
| 6,439,256 B1 * | 8/2002 | Koelsch et al. | 137/68.13 |
| 6,439,603 B1 * | 8/2002 | Damman et al. | 280/736 |
| 6,513,835 B1 * | 2/2003 | Thomas | 280/743.2 |
| 6,547,274 B1 * | 4/2003 | Ochiai | 280/735 |
| 6,550,807 B1 * | 4/2003 | Faigle et al. | 280/739 |
| 6,588,795 B1 * | 7/2003 | Fischer et al. | 280/736 |
| 6,648,371 B1 * | 11/2003 | Vendely et al. | 280/739 |
| 6,669,231 B1 * | 12/2003 | Ryan | 280/736 |
| 2001/0038201 A1 | 11/2001 | Ryan | |
| 2002/0005142 A1 | 1/2002 | Demarquilly et al. | |
| 2002/0043790 A1 | 4/2002 | Elqadah et al. | |
| 2003/0107207 A1 * | 6/2003 | Elqadah et al. | 280/735 |

FOREIGN PATENT DOCUMENTS

| | | |
|---|---|---|
| EP | 1 112 902 A2 | 7/2001 |
| GB | 2130150 A * | 5/1984 |
| JP | 2-216343 A | 8/1990 |
| JP | 11-334521 A | 12/1999 |

* cited by examiner

*Primary Examiner*—Paul N. Dickson
*Assistant Examiner*—Laura B. Rosenberg
(74) *Attorney, Agent, or Firm*—Birch, Stewart, Kolasch & Birch, LLP

(57) ABSTRACT

An on-vehicle airbag apparatus includes an airbag housing having a weakened portion, which is breakable. An airbag is stored in a folded state in the airbag housing so that the weakened portion is broken upon inflation. An inflator for generating gas for inflating the airbag is provided. The speed of response of air discharge from the airbag is sufficiently enhanced. A shutter that can open and close the air discharge port is mounted on a case. The case is formed of rigid material, is hermetically connected to an opening of the airbag and is provided with the air discharge port. A shutter-driving actuator for driving a shutter from the closed position to the opened position when in operation is connected to the shutter.

23 Claims, 7 Drawing Sheets

ON-VEHICLE AIRBAG APPARATUS

CROSS-REFERENCES TO RELATED APPLICATIONS

This nonprovisional application claims priority under 35 U.S.C. § 119(a) on Patent Application No. 2002-085679 filed in Japan on Mar. 26, 2002, the entirety of which is herein incorporated by reference.

BACKGROUND OF THE INVENTION

1. Field of the Invention

The present invention relates to an on-vehicle airbag apparatus including an airbag housing having a weakened portion, which is breakable. An airbag is stored in the folded state so as to break the aforementioned weakened portion upon inflation. An inflator is provided for generating gas for inflating the airbag. More specifically, the present invention relates to an improved structure in which a bouncing phenomenon of an occupant is prevented from occurring by exhausting air from the airbag when the airbag is in the inflated state.

2. Description of the Background Art

An air bag apparatus as described above is already known in the related art. For example, in JP-A-2-216343, an airbag apparatus is adapted to prevent internal pressure of the airbag from exceeding a predetermined pressure by opening an exhaust valve provided on the airbag in response to an increase in the internal pressure of the airbag to a preset value after inflation of the airbag.

However, in the airbag in the related art described above, opening of the exhaust valve is performed by an electric actuator such as a solenoid or the like. Thus the speed of response of opening the exhaust valve is not sufficient.

SUMMARY OF THE INVENTION

In view of such circumstances, an object of the present invention is to provide an on-vehicle airbag apparatus in which the speed of response of air discharge from the airbag may be sufficiently improved.

In order to achieve the object described above, according to a first aspect of the present invention, the on-vehicle airbag apparatus includes an airbag housing having a weakened portion, which is breakable. The airbag is stored in the folded state in the airbag housing so that the weakened portion is broken upon inflation. An inflator for generating gas for inflating the airbag is included. The on-vehicle airbag apparatus further includes a case formed of rigid material hermetically connected to the opening of the airbag and provided with an air discharge port. A shutter is mounted on the case so as to be capable of moving between a closed position in which the air discharge port is closed and an opened position in which the air discharge port is opened. A shutter-driving actuator is connected to the shutter so as to hold the shutter in the closed position when it is not in use and to drive the shutter instantaneously from the closed position to the opened position upon actuation.

According to the structure described above, the shutter-driving actuator moves the shutter from the closed position to the opened position instantaneously. Accordingly, the shutter is opened quickly at the timing when the shutter should be opened, and hence the speed of response of air discharge from the airbag may be improved.

According to a second aspect of the present invention, a pressure sensor is provided for detecting the pressure in the airbag, and a control unit for controlling operation of the shutter-driving actuator so as to actuate the shutter-driving actuator upon initiation of a lowering of the value detected by the pressure sensor after the pressure has initially increased.

According to the second aspect of the present invention, the airbag is inflated while breaking the airbag housing by actuating the inflator in response to exertion of impact on the vehicle to restrain and decelerate the occupant. The shutter-driving actuator is actuated to move the shutter instantaneously to the opened position in which the shutter opens the air discharge port in response to a change in the pressure in the airbag from an increasing state to a reducing state after a reduction of the speed of the occupant, thereby abruptly reducing the pressure in the airbag. In other words, after restraining the occupant effectively by the airbag having a sufficient internal pressure, bouncing of the occupant can be prevented to the utmost by abruptly reducing the internal pressure of the airbag immediately before bouncing of the occupant occurs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

An embodiment of the invention will now be described based on an example of the present invention shown in attached drawings.

Figure 1:
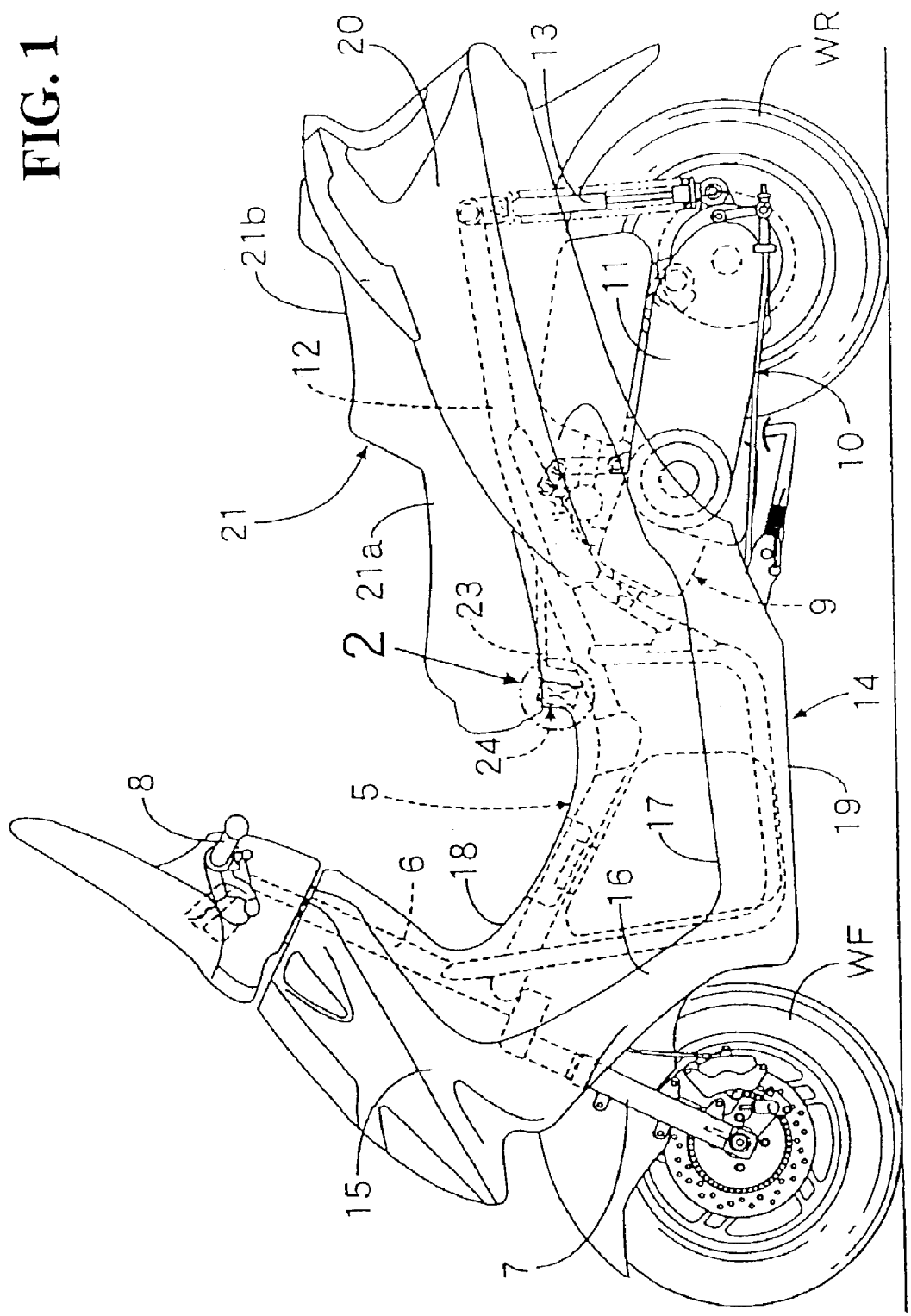
FIG. 1 is a side view of a scooter-type motorcycle.
Figure 2:
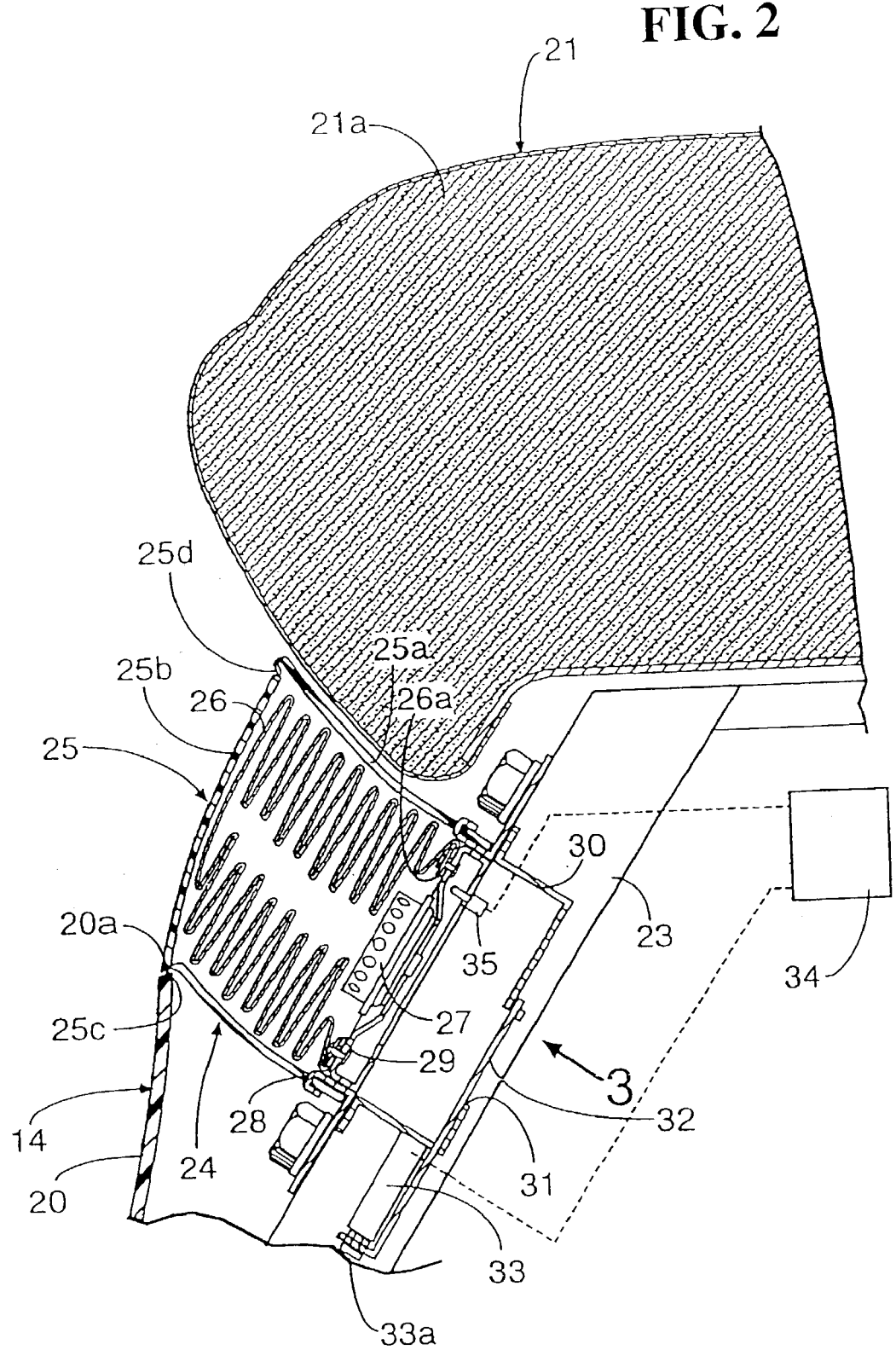
FIG. 2 is an enlarged vertical cross sectional view of the portion indicated by an arrow 2 in FIG. 1.
Figure 3:
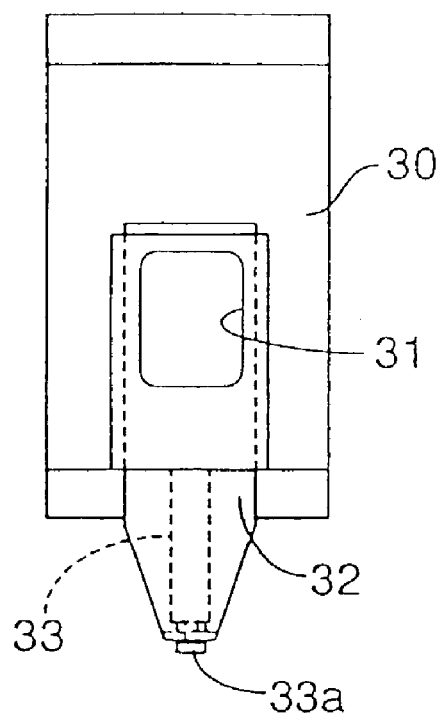
FIG. 3 is a drawing of the portion indicated by an arrow 3 in FIG. 2 in a state in which the shutter is in the closed position.
Figure 4:
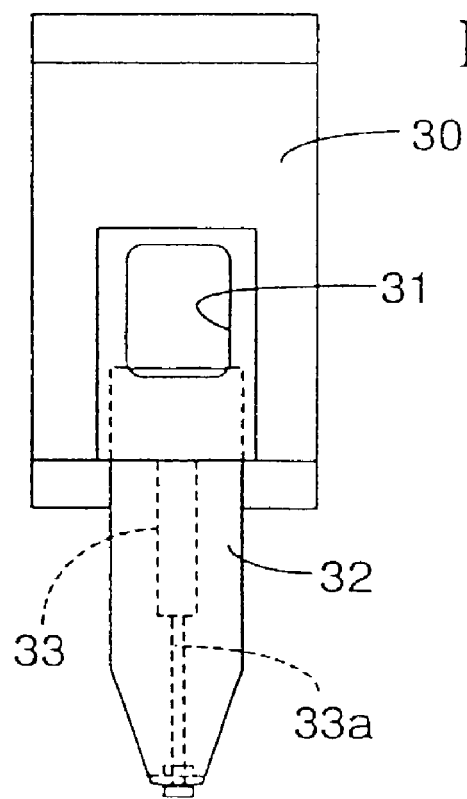
FIG. 4 is a drawing corresponding to FIG. 3, in a state in which the shutter is in the opened position.
Figure 5:
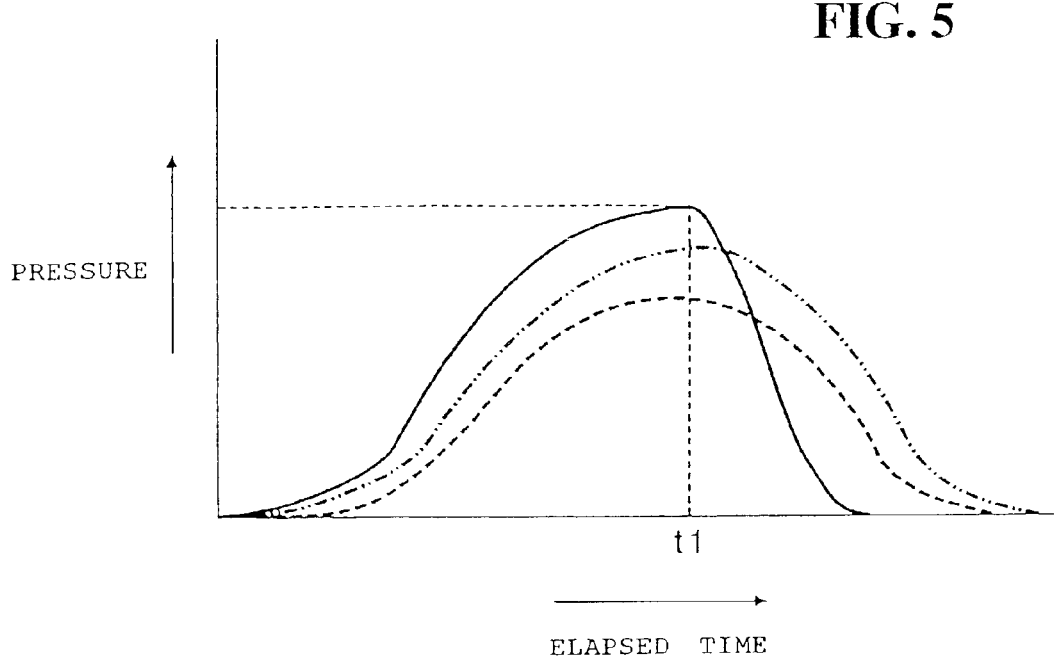
FIG. 5 is a drawing showing a change of the pressure in the airbag after it is inflated.
Figure 6:
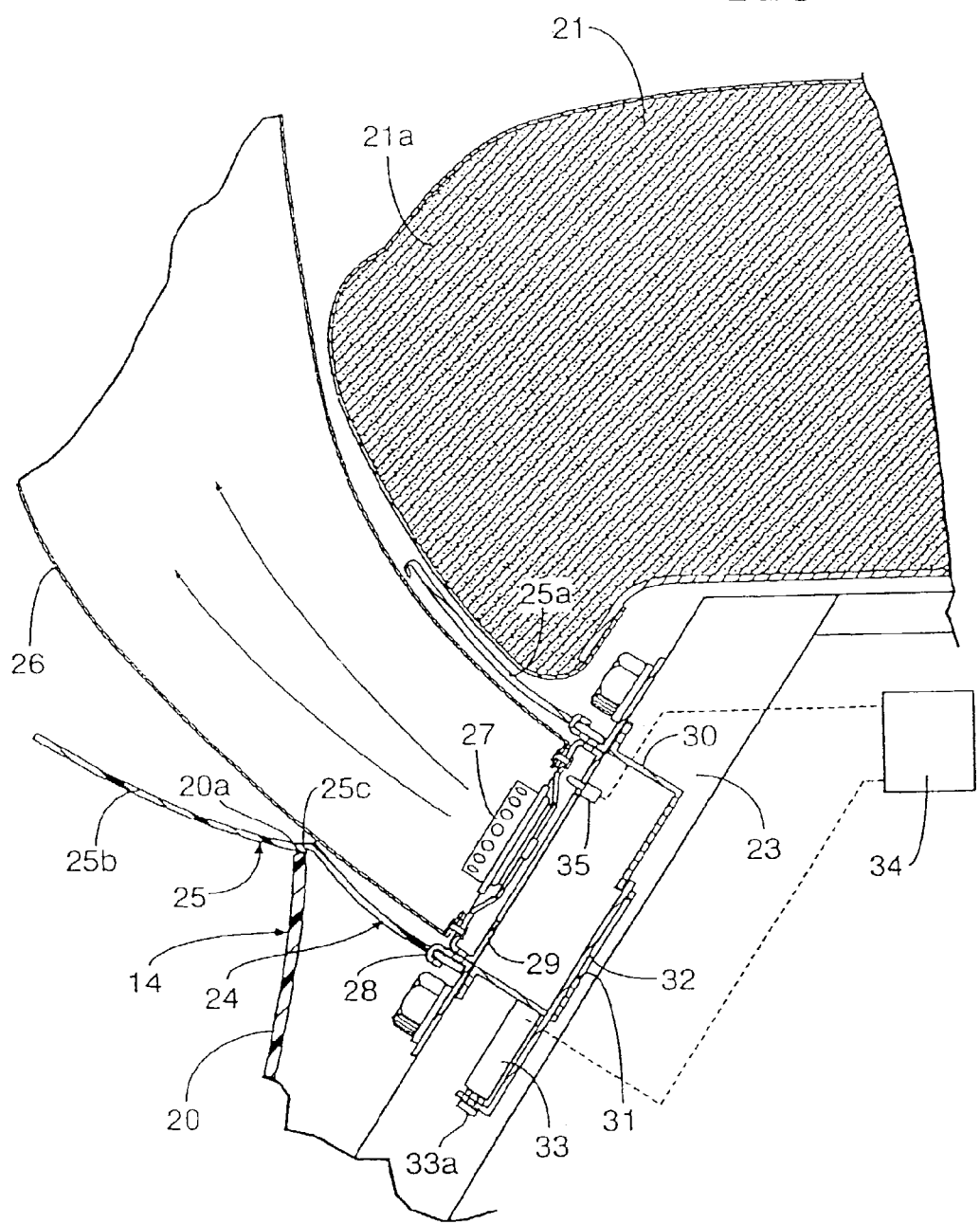
FIG. 6 is a vertical cross sectional view corresponding to FIG. 2 in a state in which the airbag is inflated.
Figure 7:
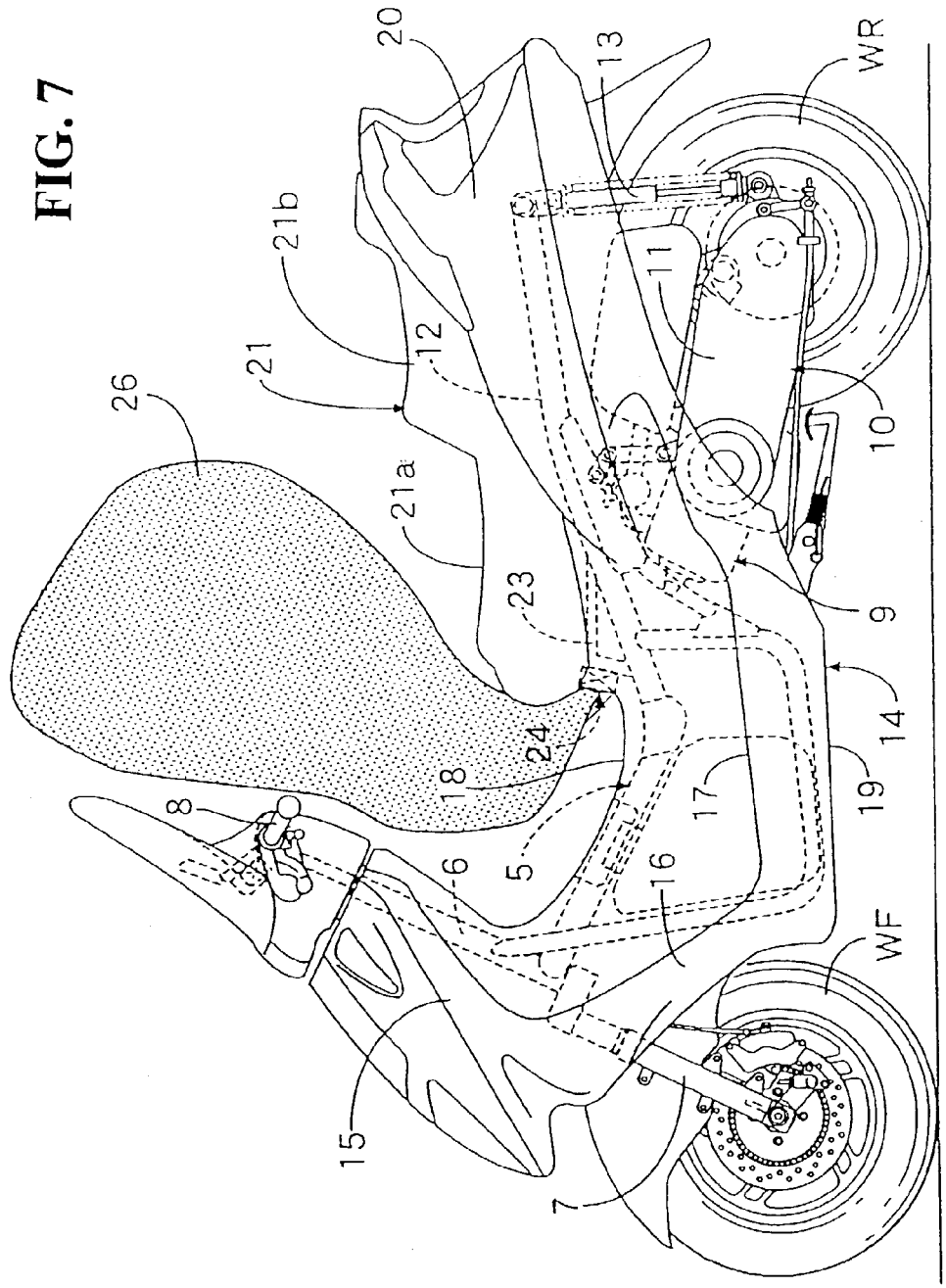
FIG. 7 is a side view corresponding to FIG. 1 in a state in which the airbag is inflated.
Figure 8:
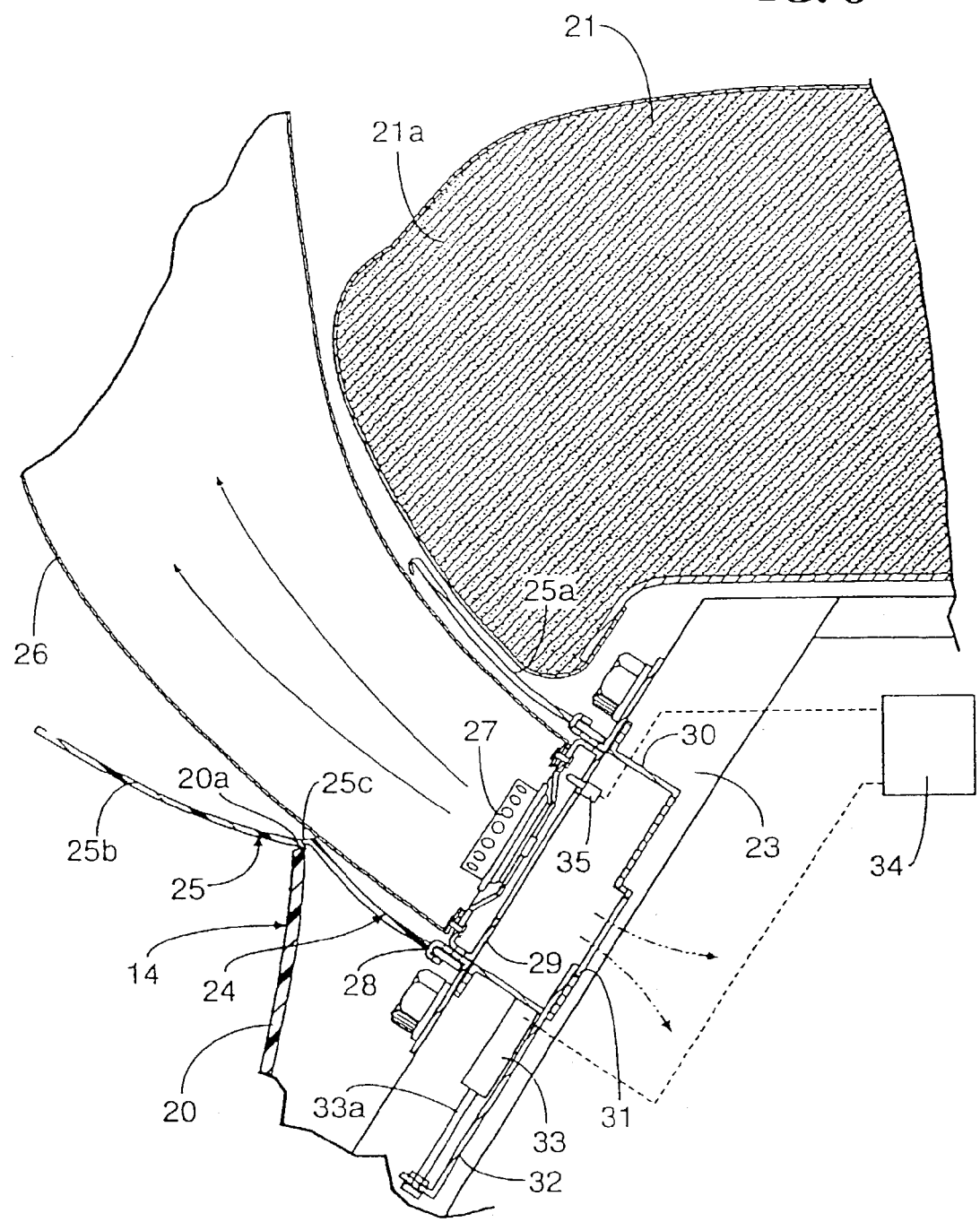
FIG. 8 is a drawing corresponding to FIG. 6 in a state in which the shutter is opened.

FIGS. 1 to 8 show an embodiment of the present invention. FIG. 1 is a side view of the scooter-type motorcycle; FIG. 2 is an enlarged vertical cross sectional view of the portion indicated by an arrow 2 in FIG. 1; FIG. 3 is a drawing of the portion indicated by an arrow 3 in FIG. 2 in a state in which the shutter is in the closed position; FIG. 4 is a drawing corresponding to FIG. 3, in a state in which the shutter is in the opened position; FIG. 5 is a drawing showing a change of the pressure in the airbag after it is inflated; FIG. 6 is a vertical cross sectional view corresponding to FIG. 2 in a state in which the airbag is inflated; FIG. 7 is a side view corresponding to FIG. 1 in a state in which the airbag is inflated; and FIG. 8 is a drawing corresponding to FIG. 6 in a state in which the shutter is opened.

In FIG. 1, a front fork 7 is steerably supported on a head pipe 6 provided at the front end of a vehicle body frame 5 of the scooter-type motorcycle. A front wheel WF is rotatably supported at the lower end of the front fork 7. A steering handle 8 is connected to the upper portion of the front fork 7. An engine unit 9 is supported for vertical swinging motion at the rear portion of the vehicle body frame 5. A transmission case 11 of a transmission 10 for shifting and transmitting power from the engine unit 9 to a rear wheel WR extends rearward from the engine unit 9 and the rear wheel WR is rotatably supported at the rear portion of the transmission case 11. A rear cushion unit 13 is provided between a seat rail 12 provided at the rear potion of the vehicle body frame 5 and the rear end of the transmission case 11.

The vehicle body frame 5 is covered by a vehicle body cover 14 formed of synthetic resin. The vehicle body cover 14 includes a front cover 15 for covering the front portion of the head pipe 6 and the upper portion of a front wheel WF. A pair of left and right leg shields 16 are joined to both left and right sides of the front cover 15 for covering forwardly of the occupant's legs. A pair of left and right foot rest portions 17 continues from the leg shields 16 for supporting the feet of the occupant. A floor tunnel portion 18 rises upwardly at the portion between the foot rest portions 17. Skirt portions 19 extend downward from the outer edges of both of the foot rest portions 17 respectively. A rear cover 20 covers the left and right sides of the rear portion of the vehicle body frame 5 and is joined to the foot rest portions 17 and the floor tunnel portion 18.

A tandem seat 21 having a front seat portion 21a on which the operator sits and a rear seat portion 21b disposed rearwardly of the front seat portion 21a so that a fellow passenger can sit thereon is provided on the rear cover 20.

Referring also to FIG. 2, a supporting stay 23 is secured to a seat rail 12 of the vehicle body frame 5 at a position downwardly of the front portion of the seat 21. An airbag module 24 of the airbag apparatus is mounted on the supporting stay 23.

The airbag module 24 includes an airbag housing 25, an airbag 26 to be stored in the airbag housing 25, and an inflator 27 for generating gas for inflating the airbag 26.

The airbag housing 25 is mounted to the supporting stay 23 facing toward an opening formed on the rear cover 20 below the front portion of the seat 21. The airbag housing 25 includes a cylindrical storage portion 25a in which the airbag 26 can be stored in the folded state and a lid portion 25b for covering an upper end opening of the cylindrical storage portion 25a. The airbag housing 25 is formed of light weight material such as synthetic resin into a cap shape and is mounted to the supporting stay 23 by a mounting strip 28 for attaching a lower end opening of the cylindrical storage portion 25a to the supporting stay 23. The lid portion 25b is connected to the cylindrical storage portion 25a via a hinged portion 25c which is disposed at a position on the periphery of the lid portion 25b, for example, a position opposite from the seat 21. A weakened portion 25d is disposed at a portion of the periphery of the lid portion 25b other than the hinged portion 25c. The weakened portion 25d is formed so as to be broken easily.

The airbag 26 is formed like a bag having an opening 26a on the lower surface thereof. The airbag 26 is stored in the airbag housing 25 in a folded state. The inflator 27 is supported by a mouth ring 29 secured to the opening 26a on the lower surface of the airbag 26. The mouth ring 29 is fixedly supported by the mounting strip 28.

The vehicle body frame 5 is provided with an impact detection sensor (not shown) such as an acceleration sensor and the like. The inflator 27 is actuated in response to the impact detection sensor upon detection of an impact larger than a predetermined value. The inflator 27 supplies high pressure gas into the airbag 26.

The mounting strip 28 is fixed with a case 30, which is formed of rigid material into a bottomed cylindrical shape. The mounting strip 28 is connected hermetically to the lower end opening 26a of the airbag 26. An air discharge port 31, for example, of a square shape is formed at the closed end of the case 30.

A shutter 32 is mounted to the outer surface of the closed end of the case 30 so as to be capable of sliding motion between a closed position in which the air discharge port 31 is closed and an opened position in which the air discharge port 31 is opened as shown in FIG. 3. A shutter-driving actuator 33, which is fixedly supported by the case 30, is connected to the shutter 32.

The shutter-driving actuator 33 includes a rod 33a which is actuated by gas generated when the inflator is actuated and projected therefrom. The rod 33a is connected to the shutter 32 in such a manner that the shutter 32 is moved instantaneously from the closed position to the opened position in response to actuation of the device for holding the shutter 32 in the closed position when it is not in operation.

Actuation, that is, ignition of the shutter-driving actuator 33 is controlled by a control unit 34. The control unit 34 controls actuation of the shutter-driving actuator 33 based on a detected value of a pressure sensor 35 mounted to the mouth ring 29 so as to detect the pressure in the airbag 26.

In this manner, the control unit 34 controls actuation of the shutter-driving actuator 33 in such a manner that the shutter-driving actuator 33 is actuated at a timing t1 when the detected value of the pressure sensor 35, in other words, the pressure in the airbag 26 starts to be lowered after it is increased once, as shown by a solid line in FIG. 5.

The operation of the present embodiment will be described. The air discharge port 31 and the shutter 32 that is capable of opening and closing the air discharge port 31 is mounted on the case, hermetically connected to the lower opening 26a of the airbag 26. The shutter 32 is connected with the shutter-driving actuator 33 for closing the air discharge port 31 when it is not in operation. The shutter 32 is driven to open the air discharge port 31 by the control unit 34 by actuating the shutter-driving actuator 33 in response to lowering of the detected value of the pressure sensor 35 for detecting the pressure in the airbag 26 after it is increased once.

In other words, the air discharge port 31 is closed in the normal state, and when an impact of more than a predetermined value is detected by the impact detection sensor due to collision or the like under such condition, the inflator 27 is actuated and feeds high-pressure gas into the airbag 26. The airbag 26 breaks the weakened portion 25d of the airbag housing 25 and instantaneously expands upwardly while opening the lid portion 25b by breaking the weakened portion 25d of the airbag housing 25 as shown in FIGS. 6 and 7. Accordingly, the operator sitting on the front seat portion 21a of the seat 21 may be restrained by the inflated and deployed airbag 26 from the front.

When the pressure in the airbag 26 is changed from the increasing state to a lowering state after the operator is decelerated by the inflated and deployed airbag 26, as shown in FIG. 8, the shutter-driving actuator 33 is actuated and the shutter 32 moves instantaneously to the opened position where the air discharge port 31 is opened, thereby abruptly decreasing the pressure in the airbag 26. In this manner, the speed of response of air discharge from the airbag 26 may be enhanced sufficiently by adapting the shutter 32 to be opened quickly at the timing when the shutter 32 should be opened by making the shutter 32 move to the opened position by the shutter-driving actuator 33.

In other words, the internal pressure of the airbag 26 is increased to a value that is sufficient for effectively restraining and decelerating the operator and then is lowered quickly. Thus, the bouncing phenomenon of the operator that may occur after the internal pressure in the airbag 26 reaches the maximum value, that is, a phenomenon to accelerate the operator in the opposite direction may be prevented from occurring. Consequently, secondary impact to the operator due to the bouncing phenomenon may be prevented from occurring.

Although the internal pressure in the airbag 26 is lowered by discharging air from the airbag disclosed in the aforementioned publication of JP-A-2-216343, this device is adapted to hold back the maximum reaction force while obtaining more desirable reaction force depending on the conditions of collision or physical construction of the operator by lowering the pressure shown by a chain line in FIG. 5 to the pressure represented by a broken line in FIG. 5, but it is not intended to cope with the bouncing phenomenon that may occur after reaching the maximum internal pressure.

In contrast to the related art, the present invention prevents the occurrence of the bouncing phenomenon of the operator by discharging air quickly from the airbag 26 in response to a lowering of the pressure after the pressure in the airbag 26 reaches the maximum pressure as described above. In addition, since air is discharged from the airbag 26 quickly in response to a lowering of the pressure after the pressure in the airbag 26 reaches the maximum pressure irrespective of increasing speed of the pressure in the airbag 26, the occurrence of the bouncing phenomenon may be prevented irrespective of the conditions of collision.

Although the embodiment of the present invention has been described thus far, the present invention is not limited to the aforementioned embodiment, and various modifications in design may be made without departing the scope of the invention.

For example, in the aforementioned embodiment, the case in which the present invention is applied to a scooter-type motorcycle has been described. However, the present invention is applicable to four-wheeled passenger cars as well as small vehicles such as motorcycles other than scooter-type motorcycles and three-wheeled motorcycles.

As described thus far, according to the first aspect of the present invention, the speed of response of air discharge from the airbag may be sufficiently improved by adapting the shutter to open quickly at a timing when the shutter should be opened.

According to the second aspect of the present invention, effective restraint of the occupant by the airbag is enabled, and the bouncing of the occupant may be minimized from occurring after the internal pressure in the airbag reached the maximum value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An on-vehicle airbag apparatus comprising:
   an airbag housing having a weakened portion, said weakened portion being breakable;
   an airbag stored in a folded state in said airbag housing so that said weakened portion is broken upon inflation;
   an inflator for generating gas for inflating the airbag;
   a case formed of rigid material hermetically connected to an opening of said airbag and provided with an air discharge port;
   a shutter mounted on said case so as to be capable of moving between a closed position in which said air discharge port is closed and an opened position in which said air discharge port is opened; and
   a shutter-driving actuator connected to said shutter so as to hold said shutter in the closed position when it is not in use and drive said shutter instantaneously from the closed position to the opened position upon actuation,
   the shutter-driving actuator including one end fixed to a side of the case and an opposite end connected to said shutter, the shutter-driving actuator pulling the shutter in a direction away from the case when sliding from the closed position to the opened position.

2. The on-vehicle airbag apparatus according to claim 1, further comprising;
   a pressure sensor, said pressure sensor detecting the pressure in said airbag; and
   a control unit, said control unit controlling operation of the shutter-driving actuator.

3. The on-vehicle airbag apparatus according to claim 2, wherein said control unit actuates said shutter-driving actuator to drive said shutter upon initiation of a lowering of a pressure value detected by the pressure sensor after the pressure has initially increased.

4. The on-vehicle airbag apparatus according to claim 2, wherein said shutter-driving actuator includes a rod mounted for movement thereon, said rod being attached to said shutter and movable upon actuation of said shutter-driving actuator to move said shutter from said closed position to said opened position.

5. The on-vehicle airbag apparatus according to claim 2, wherein said shutter is slidable by said shutter-driving actuator from said closed position to said opened position.

6. The on-vehicle airbag apparatus according to claim 2, wherein said weakened portion is formed between a lid and a body of said airbag housing, said lid including a hinged portion connecting said lid to said body of said airbag housing.

7. The on-vehicle airbag apparatus according to claim 1, wherein said shutter-driving actuator includes a rod mounted for movement thereon, said rod being attached to said shutter and movable upon actuation of said shutter-driving acuator to move said shutter from said closed position to said opened position.

8. The on-vehicle airbag apparatus according to claim 1, wherein said shutter is slidable by said shutter-driving actuator from said closed position to said opened position.

9. The on-vehicle airbag apparatus according to claim 1, wherein said weakened portion is formed between a lid and a body of said airbag housing, said lid including a hinged portion connecting said lid to said body of said airbag housing.

10. A method of protecting an operator of a vehicle equipped with the on-vehicle airbag apparatus according to claim 1, said method including mounting said on-vehicle airbag apparatus below a seat of said vehicle.

11. An air discharge mechanism for an on-vehicle airbag apparatus, the on-vehicle airbag apparatus including an airbag housing having a weakened portion, which is breakable, an airbag stored in a folded state in the airbag housing so that the weakened portion is broken upon inflation, and an inflator for generating gas for inflating the airbag, said air discharge mechanism comprising:
- a case formed of rigid material hermetically connectable to an opening of the airbag and provided with an air discharge port;
- a shutter mounted on said case so as to be capable of moving between a closed position in which said air discharge port is closed and an opened position in which said air discharge port is opened; and
- a shutter-driving actuator connected to said shutter so as to hold said shutter in the closed position when it is not in use and to slide said shutter instantaneously from the closed position to the opened position upon actuation, the shutter-driving actuator including one end fixed to a side of the case and an opposite end connected to said shutter, the shutter-driving actuator pulling the shutter in a direction away from the case when sliding from the closed position to the opened position.

12. The air discharge mechanism for an on-vehicle airbag apparatus according to claim 11, further comprising;
- a pressure sensor, said pressure sensor being capable of detecting the pressure in the airbag; and
- a control unit, said control unit controlling operation of the shutter-driving actuator.

13. The air discharge mechanism for an on-vehicle airbag apparatus according to claim 12, wherein said control unit actuates said shutter-driving actuator to drive said shutter upon initiation of a lowering of a pressure value detected by the pressure sensor after the pressure has initially increased.

14. The air discharge mechanism for an on-vehicle airbag apparatus according to claim 12, wherein said shutter-driving actuator includes a rod mounted for movement thereon, said rod being attached to said shutter and movable upon actuation of said shutter-driving actuator to move said shutter from said closed position to said opened position.

15. The air discharge mechanism for an on-vehicle airbag apparatus according to claim 12, wherein said shutter is slidable by said shutter-driving actuator from said closed position to said opened position.

16. The air discharge mechanism for an on-vehicle airbag apparatus according to claim 11, wherein said shutter-driving actuator includes a rod mounted for movement thereon, said rod being attached to said shutter and movable upon actuation of said shutter-driving actuator to move said shutter from said closed position to said opened position.

17. The air discharge mechanism for an on-vehicle airbag apparatus according to claim 11, wherein said shutter is slidable by said shutter-driving actuator from said closed position to said opened position.

18. A vehicle comprising:
- a frame;
- a seat, said seat being mounted on said frame; and
- and airbag apparatus, said airbag apparatus being mounted below said seat and comprising:
- an airbag housing having a weakened portion, said weakened portion being breakable;
- an airbag stored in a folded state in said airbag housing so that said weakened portion is broken upon inflation;
- an inflator for generating gas for inflating the airbag;
- a case formed of rigid material hermetically connected to an opening of said airbag and provided with an air discharge port;
- a shutter mounted on said case so as to be capable of moving between a closed position in which said air discharge port is closed and an opened position in which said air discharge port is opened; and
- a shutter-driving actuator connected to said shutter so as to hold said shutter in the closed position when it is not in use and drive said shutter instantaneously from the closed position to the opened position upon actuation.

19. The vehicle according to claim 18, further comprising;
- a pressure sensor, said pressure sensor detecting the pressure in said airbag; and
- a control unit, said control unit controlling operation of the shutter-driving actuator.

20. The vehicle according to claim 19, wherein said control unit actuates said shutter-driving actuator to drive said shutter upon initiation of a lowering of a pressure value detected by the pressure sensor after the pressure has initially increased.

21. The vehicle according to claim 18, wherein said shutter-driving actuator includes a rod mounted for movement thereon, said rod being attached to said shutter and movable upon actuation of said shutter-drivingactuator to move said shutter from said closed position to said opened position.

22. The vehicle according to claim 18, wherein said shutter is slidable by said shutter-drivingactuator from said closed position to said opened position.

23. The vehicle according to claim 18, wherein said weakened portion is formed between a lid and a body of said airbag housing, said lid including a hinged portion connecting said lid to said body of said airbag housing.

* * * * *